United States Patent
Leirfall

(10) Patent No.: US 6,850,328 B1
(45) Date of Patent: Feb. 1, 2005

(54) MONITORING DUST DEPOSITION

(76) Inventor: Lasse Leirfall, Solbakken, N-4790 Lillesand (NO)

( * ) Notice: Subject to any disclaimer, the term of this patent is extended or adjusted under 35 U.S.C. 154(b) by 0 days.

(21) Appl. No.: 09/403,090
(22) PCT Filed: Apr. 17, 1998
(86) PCT No.: PCT/NO98/00121
§ 371 (c)(1),
(2), (4) Date: Dec. 10, 1999
(87) PCT Pub. No.: WO98/48261
PCT Pub. Date: Oct. 29, 1998

(30) Foreign Application Priority Data

Apr. 18, 1997 (NO) ................................................ 971822

(51) Int. Cl.$^7$ ............................................. G01N 21/00
(52) U.S. Cl. ...................................................... 356/432
(58) Field of Search ................................. 356/432–444, 356/600–613

(56) References Cited

U.S. PATENT DOCUMENTS

| 3,777,173 A | 12/1973 | Landrith |
| 4,402,607 A | * 9/1983 | McVay et al. ............... 250/224 |
| 4,598,997 A | 7/1986 | Steigmeier et al. |
| 4,691,106 A | * 9/1987 | Hyun et al. ............... 250/338.1 |
| 4,793,710 A | 12/1988 | Sapko et al. |
| 4,815,856 A | * 3/1989 | Bruce .......................... 356/504 |
| 4,916,325 A | 4/1990 | Rood et al. |
| 5,229,602 A | 7/1993 | Jüliger |
| 5,412,221 A | 5/1995 | Curtis et al. |
| 5,646,734 A | * 7/1997 | Venkatesh et al. ........... 356/479 |

FOREIGN PATENT DOCUMENTS

| JP | 03069029 A | * 3/1991 |
| JP | 09-292305 | * 11/1997 |
| WO | WO 91/14935 | * 10/1991 |

* cited by examiner

Primary Examiner—Tu T. Nguyen
(74) Attorney, Agent, or Firm—Wenderoth, Lind & Ponack, L.L.P.

(57) ABSTRACT

A method for monitoring a contaminated, dirty or inflammable condition within an electrical consumer appliance, comprises using a measurement device to measure a parameter that indicates an amount of dust on a surface located within the electrical consumer appliance, and using an indicator to indicate when the amount of dust on the surface exceeds an acceptable limit.

10 Claims, 4 Drawing Sheets

MONITORING DUST DEPOSITION

BACKGROUND OF THE INVENTION

The present invention relates to monitoring a contaminated, dirty or inflammable condition caused by fallout dust. More specifically, the invention is directed to a new use of dust detection equipment to provide a warning for presence or an amount of dust or fine particles on a surface in an appliance.

A main purpose of an indicator for fallout dust is prevention of fire and explosions. However, one may envisage several important purposes, e.g. (a) being able to prevent particular odor related to dust/particle accumulations, (b) being able to improve efficiency of cooling units by preventing large accumulations of dust on cooling ribs, since such accumulations impair heat exchange capability, (c) general improvement/increasing efficiency of cleaning/service/maintenance programs, i.e. demonstrating more easily a need for cleaning, or (d) being able to maintain important parameters for electrical/electronic apparatuses within given tolerances.

In general it is previously known to measure dust and particle accumulations; however such measurements are typically made in industrial or research related environments. U.S. Pat. No. 4,793,710 discloses a method for measuring dust layers in coal mines, based upon an optical technique, and U.S. Pat. No. 5,412,221 also relates to an optical measuring method for small particle deposition ("fallout") in connection with space research. U.S. Pat. No. 5,229,602 discloses an optical method for detecting contamination layers particularly on transparent surfaces (headlight glass, windshield) on vehicles.

SUMMARY OF THE INVENTION

However, the present invention is based on a need for safeguarding life, health and property also in a normal consumer environment, and then based upon solutions that can be mass produced at a low cost, especially in such a manner that measurement and display equipment can be integrated in an appliance that is usual in such a normal consumer environment.

In a consumer market that comprises products of TV sets, audio and video appliances, larger domestic appliances like refrigerators, stoves, etc., small domestic appliances like coffee makers etc., personal care appliances, computer products like PC's and additional equipment for such products, electrical installations in dwelling units like fuse boxes/panels, electric radiators, lamps etc., it is clear that a dust monitor may be of large interest. A dust monitor may also be used in connection with allergy problems from which many people suffer. A good indication of dust accumulation in a close environment of an allergic subject may provide a good basis for demonstrating efficiency of possible counter measures, or provide a basis for starting such counter measures.

As regards ordinary cleaning, a dust monitor in accordance with the invention can of course also be an aid quite simply in demonstrating a need for ordinary cleaning.

When the word "dust" is used in the present description of the invention, one has in mind dust of different types, fine particles, dirt etc. A starting point is that the dust in question is fallout dirt consisting of particles that may hover some time in the air. Additionally, within the concept of dust, it is possible to distinguish between house dust, industrial dust and traffic dust. House dust is a mixture of fabric fibers (various forms of fabrics like cotton), and pollen (different forms of pollen, i.e. grain, grass, flower pollen etc.). Industrial dust is various types of waste products like grinding dust from wood and metals, and other waste products (contamination, pollution). Traffic dust is a mixture of asphalt, exhaust and different types of gases (pollution).

Hence, the purpose of the invention is to provide a warning/indication regarding accumulation of dust in important positions for consumers, and in accordance with the invention this has been achieved through a use of the type defined in the appended claims.

BRIEF DESCRIPTION OF THE DRAWINGS

In the following the invention shall be illuminated further by examining certain exemplary embodiments, and in this connection it is referred to the appended drawings, where.

DETAILED DESCRIPTION OF THE PREFERRED EMBODIMENTS

Figure 1A:
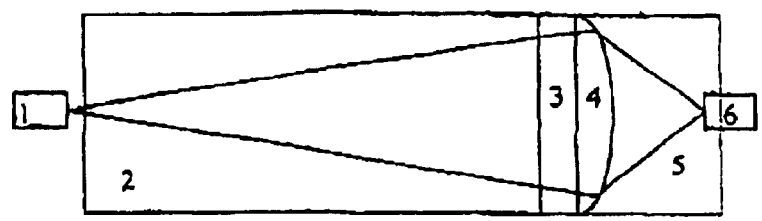
FIGS. 1a and 1b show schematically a dust meter of an optical type, in views from above and from a side, respectively.
Figure 1B:
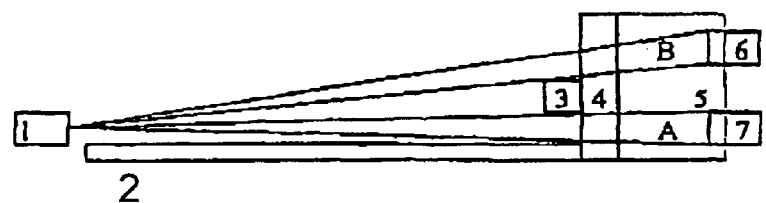

A concrete use of the invention is, as mentioned above, in connection with detecting and giving a warning regarding dust accumulation in a TV set. The embodiments now to be discussed with reference to the drawing are envisaged in such a connection, but it is emphasized once more that also other consumer appliances are of interest, as explained previously. In FIGS. 1a and 1b appear a schematic layout for a dust meter that is mountable inside a TV set. A plate 2, preferably arranged horizontally will little by little accumulate dust and particles that are deposited from an air space above the plate. A light source 1 is arranged at the left end of the plate 2, which light source emits light in such a manner that it propagates at least along a top side of the plate 2, and in addition in a space above the plate that supposedly does not contain any dust, i.e. at such a height above the plate that it is improbable that a dust layer will ever grow that high. The two main light paths appear in FIG. 1b, i.e. two light paths indicated by two divergent pairs of broken lines. (Light may of course also spread outside of these directions, but such light will not be of any use in connection with an actual measurement.)

A screen 3 provides a division between two light beams of interest, the two light beams being termed A and B, i.e. A in the dust layer area, and B in the air space above the dust layer.

As appears from FIG. 1a, it is favorable to have a wide light beam, or make the light beam spread such as shown in FIGS. 1a and 1b, along the dust layer, in order to increase measurement sensitivity and to decrease uncertainty. A lens 4 collects both beams A and B to respective detection areas, where two separate detectors 6, 7 measure light intensities. The lens 4 maybe a normal convex lens, or, such as indicated in the figures, a cylinder lens, since it may be sufficient to focus the light in a horizontal plane. It will be favorable to build both detectors 6,7, the lens 4 and the screen 3 together inside a closed box 5, indicated in the figures by broken lines.

The intensity of light beam A will be reduced when the dust thickness on plate 2 grows, while the reference light in beam B will not be influenced by this layer of dust. Dust on the light source 1 will attenuate both beams equally. It is possible to adjust recordable dust thickness mechanically by adapting a height of a light slit between screen 3 and plate 2. The top surface of plate 2 should be dull so as to avoid reflections. As mentioned, it is favorable with a light beam having a certain width in a horizontal plane, and this can be achieved by virtue of a lens (not shown) between the light source 1 and plate 2, or by making the light source emit a relatively wide beam such as shown in FIG. 1a.

Figure 2:
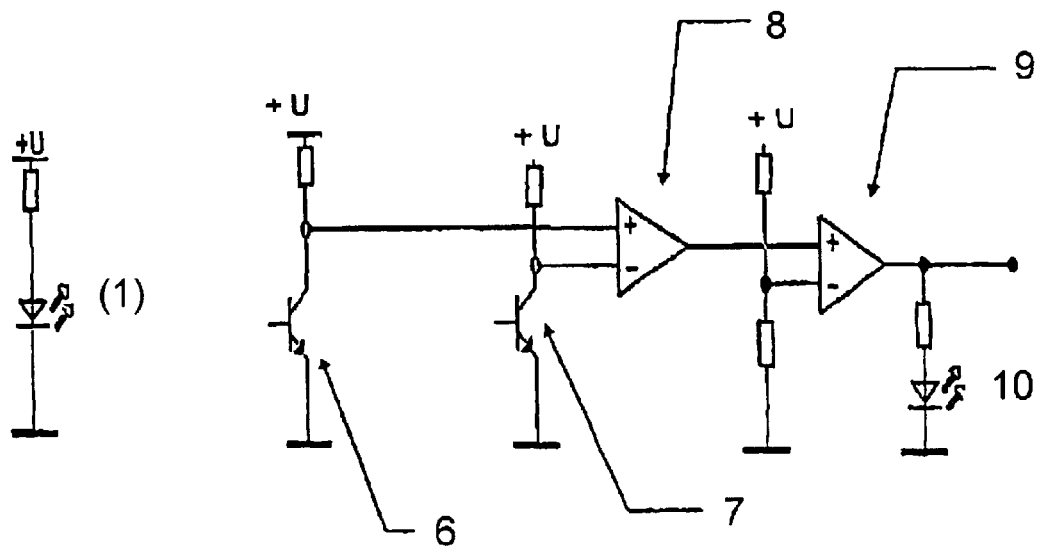
FIG. 2 shows a circuit diagram for an optical detector used in the dust meter shown in FIGS. 1a and 1b, FIGS. 3a and 3b show a dust meter of a thermal type, in views from above and from a side, respectively.

Regarding an electric/electronic aspect of this matter, referred to is FIG. 2 which shows an easily realized design of electrical circuitry that is necessary in connection with the configuration of FIGS. 1a and 1b. The light source 1 is shown in a simple circuit at the left in the figure, in the form of a light-emitting diode (LED), and in a detection circuit to the right in the figure, detectors 6 and 7 are shown as phototransistors connected in a simple manner to provide input signals for a differential amplifier 8 (it is also possible to use photodiodes.) As the dust thickness increases, and thereby beam A is attenuated, a ratio between two voltage inputs to the differential amplifier 8 is upset, and voltage output form the differential amplifier 8 will increase. This is detected by virtue of comparator 9 which compares to a fixed reference voltage delivered by a simple voltage divider. If output from comparator 9 exceeds a certain voltage, an alarm light diode 10 is switched on, and this represents a possible indication that an undesired thickness of the dust layer has been reached.

The electronic circuitry after the photo detectors 6,7 will in reality depend on how possible dust recordal shall be indicated, i.e. if, such as shown here, a light diode shall be lit, if a measurement value shall be exhibited in a display or possibly in a TV screen, or a special indication may also be cutting supply voltage from the TV set.

Hence, in the shown embodiment, an exceeded dust limit is marked by lighting a light diode, and by outputting a logic "high" signal. However, it is quite feasible to grade the alarm for indicating several thicknesses of dust, but this will then require a somewhat different circuit solution than what has been shown.

If the detector is to be located in an area where light can get in, the light source 1 should be modulated so that a receiver part can be AC coupled; however, such a solution has not been shown in the drawings. The solution with a modulated light source will of course be a little more costly.

As a matter of principle, it will of course also be possible to transmit light "transversely" to the dust layer; that is in FIG. 1b with a light source situated above plate 2, preferably with a light beam expanding element in the form of a lens, with a transparent or reflecting plate 2, and with detection below or above the plate, respectively. A reference measurement must then be made in some other manner, e.g. with a detector attached to the light source in a dust-free configuration, i.e built-in together with the light source.

Experiments that have been conducted in accordance with the solution shown in FIGS. 1a, 1b and FIG. 2, show that light traveling along a dust surface, will be attenuated approximately in proportion to dust thickness. Experiments further indicate that density of the dust layer is of little importance with this detection solution.

Figure 3A:
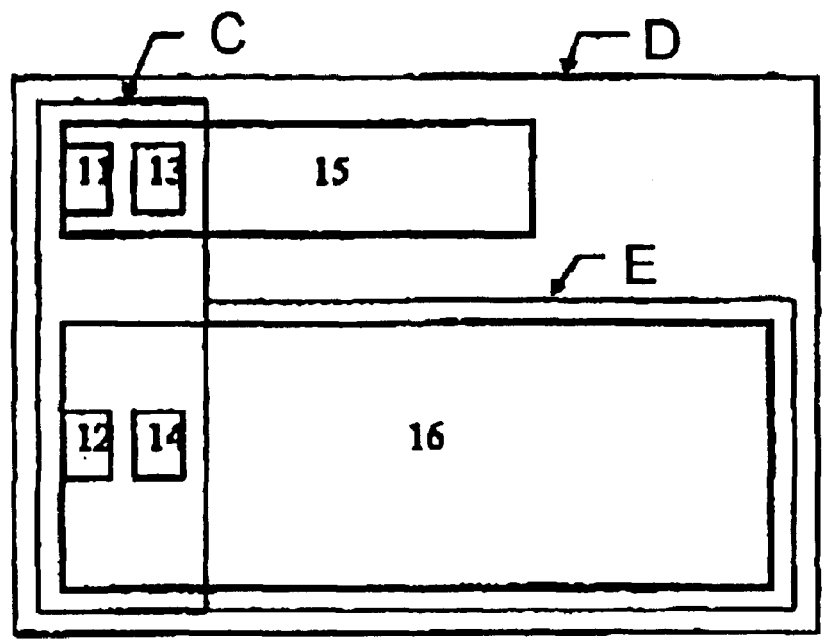
Figure 3B:
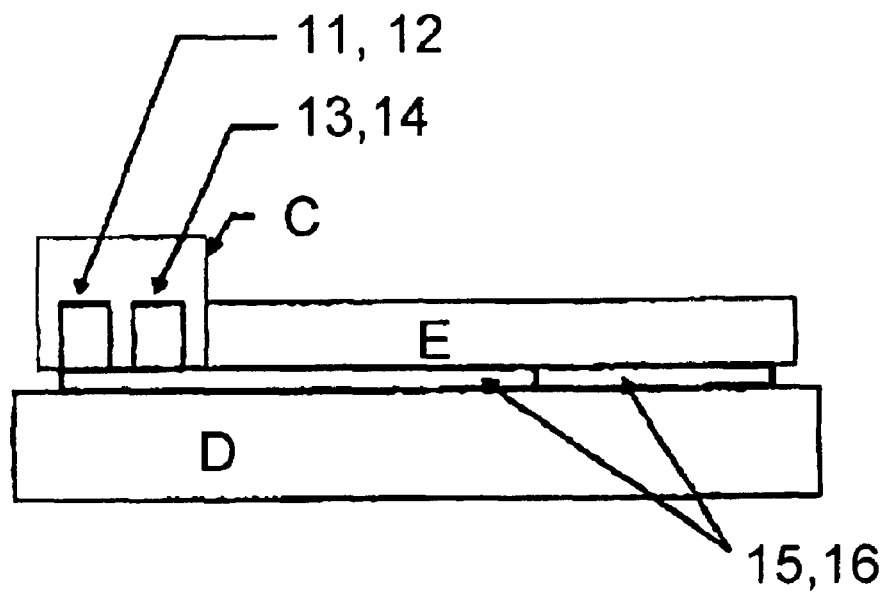

Quite different measurement techniques than optical detection can also be used regarding detecting dust layers, and in FIGS. 3a and 3b is shown a thermal detector for the same purpose. The principle utilized here, is based on the fact that a dust layer will have an insulating effect, so that temperature of a heated surface will increase with increasing dust thickness. To achieve a reliable detection, a reference measurement toward a point that does not depend on the dust layer, should be used.

The thermal detector is built on an insulating support D in order to maintain a heat loss that is as small as possible in that direction. Heating elements may be two resistors 11 and 12 connected in parallel and placed on respective cooling surfaces 15 and 16, as shown in FIG. 3a which is a top view of the detector. The cooling surface 15 is an actual dust sensor, which little by little shall be coated by dust, while cooling surface 16 is a reference. Cooling surface 16 is made insensitive to dust by covering it with an insulation layer E that is not too thick. Here it is a goal that thermal resistance through insulation layer E shall be significantly higher than thermal resistance in a dust layer, so that such a dust layer does not influence the heat emission from the cooling surface. In order to obtain sufficient cooling despite this, cooling surface 16 is made relatively large.

Thermistors are preferably used as temperature sensors 13 and 14. (Other types of sensors are of course also of interest, e.g. thermocouples.) The dust sensor, i.e. the cooling surface 15, will have a reduced cooling effect when it is gradually covered by a dust layer, so that temperature in the thermal sensor 13 will be a function of dust thickness. Temperature in thermal sensor 14 will on the other hand stay substantially constant, even if dust falls upon the insulation layer E.

Closely adjacent to the thermal sensors 13 and 14, the temperature should be substantially higher than ambient temperature. This is achieved by supplying sufficient power (about 1–5 watts), and by insulating above the thermal sensors and the heating elements via insulation layer C. Physical dimensions of insulating layer C may be about 5×5 cm with a maximum height about 2 cm, as seen in FIG. 3b.

Figure 4:
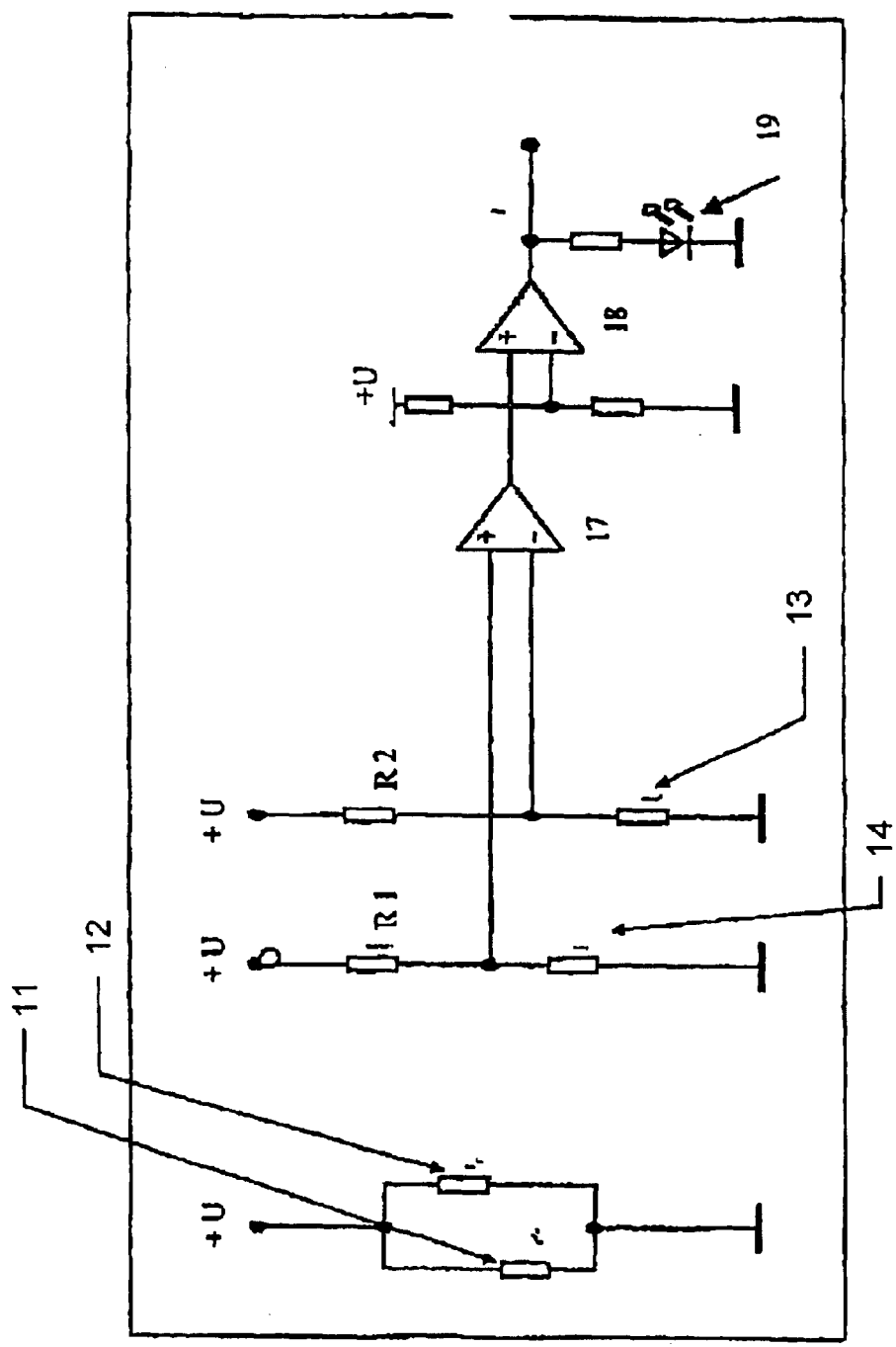
FIG. 4 shows a circuit diagram for a detector in connection with the thermal dust meter shown in FIGS. 3a and 3b.

An example of a circuit diagram in connection with the thermal detector shown schematically in FIGS. 3a and 3b, appears in FIG. 4. In the example shown in FIG. 4, an end part of a detection circuit is rather similar to that shown in FIG. 2 regarding the optical detection circuit, i.e. from a differential amplifier 17 through a comparator 18 and to an alarm light-emitting diode 19. However, the phototransistors 6 and 7 in FIG. 2 are exchanged for thermistors 13 and 14 in FIG. 4, for delivering signal voltages to the differential amplifier 17. Each one of the thermistors 13 and 14 is part of a voltage divider together with resistors R2 and R1, respectively. Heating elements 11 and 12 are part of a separate, simple parallel circuit.

All resistors in the above-described, including the heating elements, should have a tolerance of 1% or better, while accuracy of supply voltage U is not critical.

Both described solutions for detecting dust layer thickness are simple, and the total cost in mass production can be expected to be less than NOK 10 in both alternatives, with the thermal solution being the less expensive one.

One further possibility for detecting a dust layer is a mechanical sensing method, which method can be based upon a strain principle or a pressure principle. The strain principle is based on bending a plate due to dust weight. In such a case a strain gauge may be an actual sensor. When the pressure principle is used, a pressure sensor on an underside of an accumulation surface senses weight of the dust layer; that is superpressure growing gradually in addition to start pressure caused by weight of the surface/plate itself.

Independent of the type of sensor that is used, a signal from the sensor will normally have to be amplified, i.e. an amplifier succeeding the sensor shall record current or voltage from the sensor, and adapt a level for a display unit that may be of various types. In order to make relative measurements, the amplifier should be a differential amplifier with the sensor in a measurement bridge.

Regarding the display unit, this unit may be of several different types. As shown in FIG. 2 and FIG. 4, display takes place by virtue of a simple light-emitting diode, which is lit when the dust layer reaches a certain thickness. It is of course also possible with a display of a more advanced type, e.g. for displaying an actual thickness of the dust layer as measured by a suitable unit of measurement. A seven-segment type display or an intelligent display may then be utilized. Further possibilities are that the display unit may control a current switch for switching off an appliance in question if the dust thickness exceeds a critical value. Further possibilities include connection to a monitor screen with an opportunity for text in the screen. This last mentioned solution may be of interest if the dust monitor is to be built-in, in an integrated manner in a TV set or a computer monitor.

In this last mentioned case it is favorable to manufacture a dust warning unit as an individual unit, or possibly as an integral part of an appliance. If the dust warning unit is produced as an individual unit, it must be suitable for fitting into the appliance at a later time. As an integral part, it will be included as a production element in an appliance, e.g. a TV set, and as previously mentioned, possibly at a very low cost.

Voltage supply may be standardized at 5.0 volts. This voltage may vary within a given range, without influencing reliability of the dust monitor.

As previously mentioned, it is favorable to base the dust sensor on relative measurements, so that external and spurious influences shall not be disturbing.

Quite generally it is important to underline that the "warning" that shall take place, may take place in different manners. As mentioned above, one may most easily visualize a light indicator in some form (one further such indicator may be a simple luminous indication with a color dependent on dust amount), but it may also be of interest to use an acoustic signal, i.e. some form of sound emission. Also, a text indication as mentioned above in connection with a TV set/computer monitor is an important possibility. Of course, one may also visualize a combination of these indication modes.

It is also favorable in certain applications to provide the possibility that the display may provide information that the system is operational, and that it is working.

Figure 5:
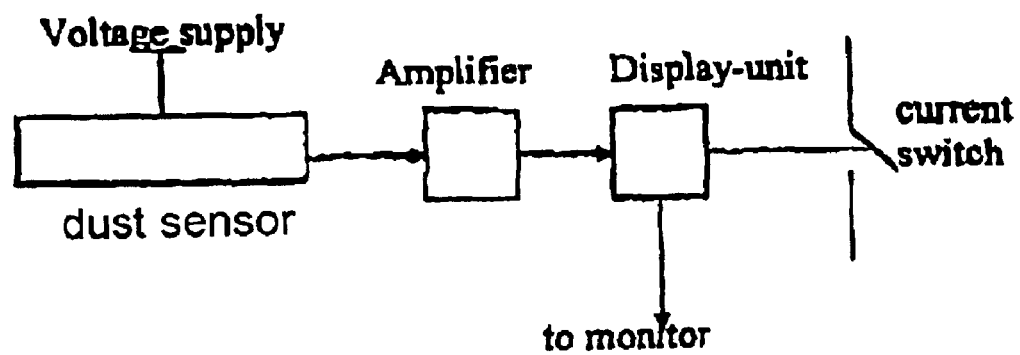
FIG. 5 shows a dust meter that can be used in accordance with the invention, in its most general form.

In FIG. 5 is shown a dust measurement device in its most general form as mentioned above, i.e. independent of a physical measurement principle that may be optical, thermal, weight-based, ultrasound-based, possibly based on measurement of electrical characteristics like resistance, capacity etc. Absorption/attenuation of types of radiation other than optical and ultrasound radiation can be envisaged, e.g nuclear radiation with a radiation source similar to the one that is utilized in smoke detectors. Thus, in this figure "the dust sensor", which normally will require a voltage supply, comprises some sensor type that is able to deliver a signal depending on a dust amount that is measured. The signal passes to an amplifier that delivers an output signal further to a display unit and possibly to an alarm unit. The display unit may preferably comprise or be attached to a monitor screen, and it may possibly be switchable on and off by virtue of a switch.

What is claimed is:

1. A method for monitoring a contaminated, dirty or inflammable condition within an electrical consumer appliance, comprising:

using an optical measurement device to measure attenuation of a light beam transmitted through dust that is on a surface located within the electrical consumer appliance; and using an indicator, connected to said optical measurement device, to specify a measurement value that is a function of the measured attenuation of said light beam so as to indicate a thickness of the dust on said surface and thereby indicate when an amount of dust on said surface exceeds an acceptable limit.

2. The method according to claim 1, wherein using optical measurement device to measure attenuation of light beam transmitted through the dust that is on said surface located within said electrical consumer appliance comprises using said optical measurement device to measure attenuation of a light beam transmitted through the dust that is on said surface located within a television set.

3. The method according to claim 1, wherein using the optical measurement device to measure attenuation of beam transmitted through the dust that is on said surface located within said electrical consumer appliance comprises comparing an output intensity of said light beam with an intensity of a reference light beam that is not transmitted through the dust that is on said surface.

4. The method according to claim 1, wherein using the optical measurement device to measure attenuation of the light beam transmitted through the dust that is on said surface located within said electrical consumer appliance comprises using the optical measurement device to measure attenuation of a divergent or expanded light beam transmitted along and through the dust and then focused towards a photodetector via a lens that is positioned beyond said surface.

5. The method according to claim 1, wherein using the optical measurement device to measure attenuation of the light beam transmitted through the dust that is on said surface located within said electrical consumer appliance comprises using the optical measurement device to measure attenuation of a light beam transmitted transversely through the dust and reflected from said surface.

6. The method according to claim 1, wherein using the optical measurement device to measure attenuation of the light beam transmitted through dust that is on a surface located within an electrical consumer appliance comprises using the optical measurement device, located within said electrical consumer appliance, to measure attenuation of the light beam transmitted through the dust that is on said surface located within said electrical consumer appliance.

7. The method according to claim 6, wherein using the optical measurement device to measure attenuation of the light beam transmitted through the dust that is on said surface located within said electrical consumer appliance comprises using said optical measurement device to measure attenuation of the light beam transmitted through the dust that is on said surface located within a television set.

8. The method according to claim 6, wherein using the optical measurement device to measure attenuation of a light beam transmitted through the dust that is on said surface located within said electrical consumer appliance comprises comparing an output intensity of said light beam with an intensity of a reference light beam that is not transmitted through the dust that is on said surface.

9. The method according to claim 6, wherein using the optical measurement device to measure attenuation of the light beam transmitted through the dust that is on said surface located within said electrical consumer appliance comprises using the optical measurement device to measure attenuation of a divergent or expanded light beam transmitted along and through the dust and then focused towards a photodetector via a lens that is positioned beyond said surface.

10. The method according to claim 6, wherein using the optical measurement device to measure attenuation of the light beam transmitted through the dust that is on said surface located within said electrical consumer appliance comprises using the optical measurement device to measure attenuation of a light beam transmitted transversely through the dust and reflected from said surface.

* * * * *